No. 660,442. Patented Oct. 23, 1900.
F. E. IVES.
PHOTOCHROMOSCOPIC APPARATUS.
(Application filed Mar. 9, 1900.)
(No Model.) 3 Sheets—Sheet 1.

Witnesses:
Louis M. T. Whitehead.
F. E. Bechtold.

Inventor:
Frederic E. Ives.
by his Attorneys:
Howson & Howson

No. 660,442. Patented Oct. 23, 1900.
F. E. IVES.
PHOTOCHROMOSCOPIC APPARATUS.
(Application filed Mar. 9, 1900.)

(No Model.) 3 Sheets—Sheet 2.

Witnesses:—

Inventor:—
Frederic E. Ives.
by his Attorneys:—

No. 660,442. Patented Oct. 23, 1900.
F. E. IVES.
PHOTOCHROMOSCOPIC APPARATUS.
(Application filed Mar. 9, 1900.)

(No Model.) 3 Sheets—Sheet 3.

Witnesses:-
Chas. De Cou.
Louis W. Colehead.

Inventor:-
Frederic E. Ives.
by his Attorneys

UNITED STATES PATENT OFFICE.

FREDERIC EUGENE IVES, OF PHILADELPHIA, PENNSYLVANIA.

PHOTOCHROMOSCOPIC APPARATUS.

SPECIFICATION forming part of Letters Patent No. 660,442, dated October 23, 1900.

Application filed March 9, 1900. Serial No. 8,093. (No model.)

*To all whom it may concern:*

Be it known that I, FREDERIC EUGENE IVES, a citizen of the United States, residing in Philadelphia, Pennsylvania, have invented certain Improvements in Photochromoscopic Apparatus, of which the following is a specification.

The object of my invention is to provide in photochromoscopic apparatus simple means for equalizing the size of the three images produced from a single view-point and disposed side by side in the same plane or for the optical superposition at a single view-point of three such images, an object which I attain in the manner hereinafter set forth, reference being had to the accompanying drawings, in which—

Figure 2:
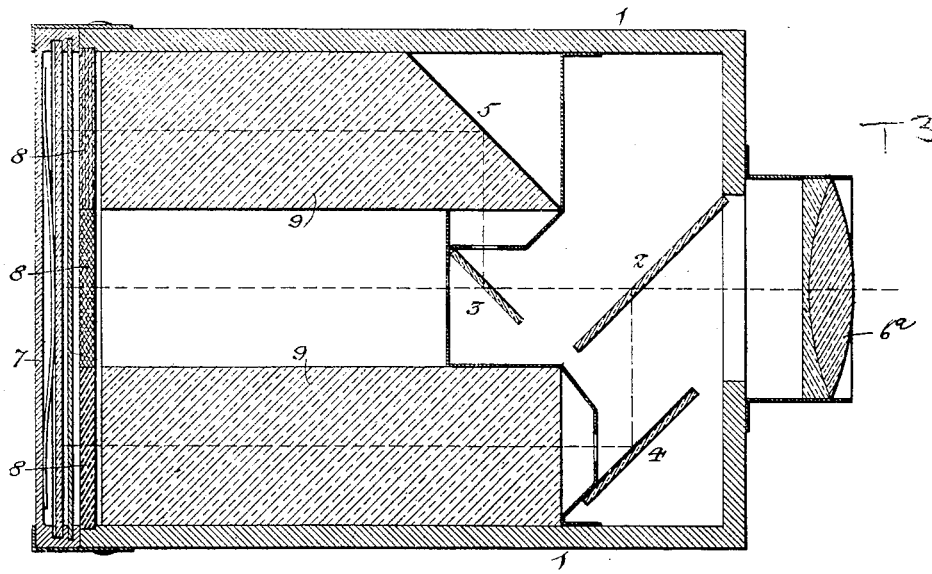
Figure 1:
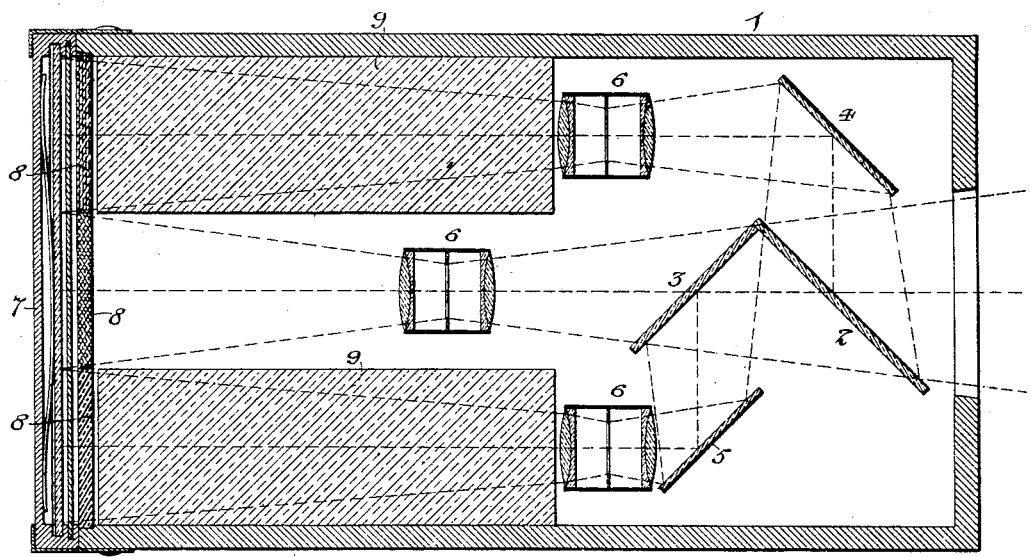
Figure 5:
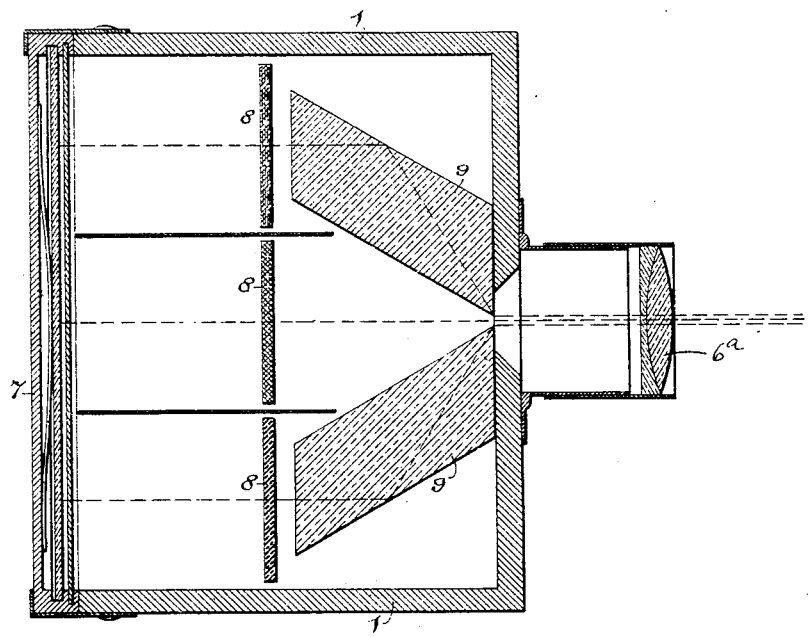
Figure 4:
Figure 5:
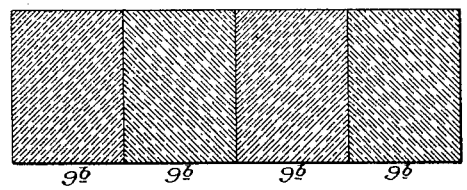
Figure 6:
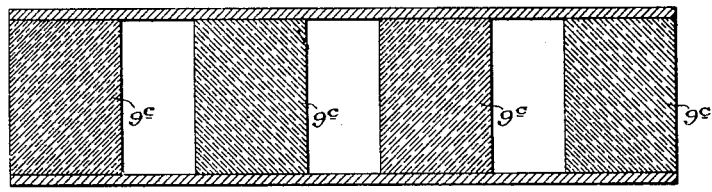
Figure 7:
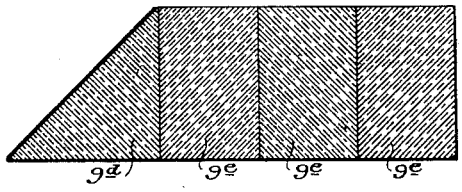
Figure 8:
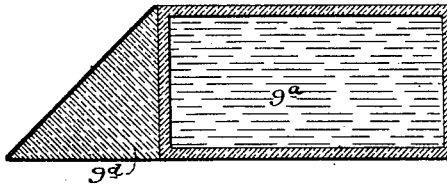

Figure 1 is a sectional plan view of a photochromoscopic camera constructed in accordance with my invention. Fig. 2 is a view illustrating another form of camera embodying the invention. Fig. 3 is a view illustrating still another form in which the invention can be embodied, and Figs. 4, 5, 6, 7, and 8 are sectional views showing other modifications of the invention.

What I term a "photochromoscopic" camera is an instrument for producing from a single view-point three images side by side in the same plane, and a photochromoscope is an instrument for viewing from a single view-point three such images. When such apparatus is so constructed that the distance from the view-point to the outer images is greater than the distance from the view-point to the central image, it becomes necessary to provide an optical compensation for this difference in distance in order to equalize the images. In the instrument shown in my Patent No. 546,889, dated September 24, 1895, this was accomplished by introducing additional reflecting-surfaces, by which the length of the ray between the central image and the view-point was made equal to that of the corresponding rays between the view-point and the outer images. In my present invention the cone of rays to each outer image is stretched out and the focal point extended by introducing in the path of these rays a body of glass or other refracting medium, which in technical language "retards" the light-ray.

In Fig. 1 the casing or box of the camera is represented at 1, while 2 and 3 are transparent inclined reflectors located in the path of the incident ray, the rays reflected from the plate 2 being directed onto an inclined opaque reflector 4 and the rays reflected from the plate 3 being directed onto an inclined opaque reflector 5, so that all three series of rays will be directed rearwardly through suitable lens constructions 6 and will form images side by side upon a single plate contained in a plate-holder 7 at the rear end of the box, the rays before reaching the plate passing through suitable color-screens 8. The reflected rays, which form the side images of the series, also pass through rectangular blocks 9 of glass interposed in the path of the rays, between the lens structure 6 and the plate, whereby the focal point of these side rays is extended to such an extent that the images formed upon the sensitive plate will all be equal and properly focused. For instance, if the axial rays to the outer images are two inches longer from the view-point than the axial ray to the central image it is necessary to extend the focal point of the outer rays to the extent of two inches, and this may be accomplished by introducing in the path of each longer ray six inches of transparent substance having a refractive index of 1.5, which is approximately the refractive index of crown-glass. If a heavy silicate flint glass having a refractive index of 1.96 is used, a length of slightly more than four inches will be sufficient, or in place of a solid block of refractive medium a glass tank of proper size and shape filled with a suitable liquid may be employed—as shown, for instance, at $9^a$ in Fig. 5.

In the construction shown in Fig. 2 a single lens $6^a$ is employed at the front of the camera instead of the series of lenses within the camera, as shown in Fig. 1, and one of the refracting-blocks 9 has a prismatic front end which may be silvered, so that it serves the purpose of a side reflector 5.

The construction shown in Fig. 3 illustrates the application of my present invention to a camera of the character set forth in my Patent No. 632,573, dated September 5, 1899, said camera having points of view practically coincident, though in reality very slightly separated. Both refracting-blocks in this case are prismatic and serve also as reflectors for directing rearward the rays for forming the outer images.

It will be evident that in carrying out my invention two or more blocks of glass cemented together may be used in place of a single block. Thus in Fig. 5 I have shown four blocks $9^b$ used in this way, or the blocks may be separated from each other—as shown, for instance, at $9^c$ in Fig. 6—or one or more rectangular blocks may be combined with a prism, or said prism may be combined with one or more tanks or cells filled with liquid. Thus in Fig. 7 I have shown a prism $9^d$ combined with three rectangular blocks $9^e$, and in Fig. 8 I have shown said prism $9^d$ combined with a rectangular vessel $9^a$, filled with liquid.

Having thus described my invention, I claim and desire to secure by Letters Patent—

1. In photochromoscopic apparatus, the combination of means for dividing the rays from the view-point or collecting the divided rays at the view-point, with transparent bodies of more highly refractive substance than air interposed in the path of the longer rays to equalize images which are in the same plane, but at different distances from the view-point.

2. In photochromoscopic apparatus, the combination of means for dividing the rays from the view-point or for collecting the divided rays at such view-point, with bodies of more highly refractory substance than air interposed in the path of the longer rays to equalize images which are in one plane but at different distances from the view-point, said transparent refractive bodies having portions which also serve as reflectors, substantially as specified.

In testimony whereof I have signed my name to this specification in the presence of two subscribing witnesses.

FREDERIC EUGENE IVES.

Witnesses:
JOHN W. TAGGART,
F. E. BECHTOLD.